US010035519B2

(12) United States Patent
Minster et al.

(10) Patent No.: US 10,035,519 B2
(45) Date of Patent: Jul. 31, 2018

(54) SYSTEM AND METHOD FOR AUTONOMOUS VEHICLE DRIVING BEHAVIOR MODIFICATION

(71) Applicant: GM GLOBAL TECHNOLOGY OPERATIONS LLC, Detroit, MI (US)

(72) Inventors: Gautier Minster, San Francisco, CA (US); Sohrab Haghighat, San Francisco, CA (US); Kevin Chu, San Francisco, CA (US); Kyle Vogt, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/460,106

(22) Filed: Mar. 15, 2017

(65) Prior Publication Data

US 2017/0267256 A1 Sep. 21, 2017

Related U.S. Application Data

(60) Provisional application No. 62/308,719, filed on Mar. 15, 2016.

(51) Int. Cl.
*B60W 50/10* (2012.01)
*B60W 30/12* (2006.01)
(Continued)

(52) U.S. Cl.
CPC ............ *B60W 50/10* (2013.01); *B60W 40/09* (2013.01); *B60W 50/082* (2013.01); *G01C 21/3407* (2013.01); *G01C 21/3484* (2013.01); *G05D 1/0088* (2013.01); *B60W 2420/42* (2013.01); *B60W 2420/52* (2013.01); *B60W 2510/30* (2013.01); *B60W 2520/10* (2013.01); *B60W 2520/105* (2013.01); *B60W 2540/30* (2013.01); *B60W 2710/30* (2013.01); *B60W 2720/10* (2013.01); *B60W 2720/106* (2013.01)

(58) Field of Classification Search
CPC ........ B60W 50/10; B60W 30/00; G05D 1/00; G05D 1/0088; G01C 21/26
See application file for complete search history.

(56) References Cited

U.S. PATENT DOCUMENTS 9,008,890 B1 * 4/2015 Herbach ............... B60W 30/00
340/435
9,347,779 B1 * 5/2016 Lynch .................... G01C 21/26
(Continued)

*Primary Examiner* — Yuri Kan
(74) *Attorney, Agent, or Firm* — Lorenz & Kopf

(57) ABSTRACT

A system and method for autonomous vehicle driving behavior modification include: receiving passenger driving behavior preferences for setting a driving behavior of an autonomous vehicle; generating driving behaviors controls based on the passenger driving behavior preferences; setting an initial driving behavior of the autonomous vehicle using the driving behavior controls, wherein setting the initial driving behavior comprises providing the driving behavior controls to be implemented by the autonomous vehicle during one or more routes involving the passenger; aggregating vehicle behavior feedback relating to a driving behavior of the autonomous vehicle during the one or more routes; and modifying the driving behavior of the autonomous vehicle based on the vehicle behavior feedback.

11 Claims, 3 Drawing Sheets

(51) Int. Cl.
    *G05D 1/00*     (2006.01)
    *B60W 40/09*     (2012.01)
    *B60W 50/08*     (2012.01)
    *G01C 21/34*     (2006.01)

(56) References Cited

U.S. PATENT DOCUMENTS

| | | | |
|---|---|---|---|
| 2015/0158486 A1* | 6/2015 | Healey | B60W 30/12 701/23 |
| 2016/0378112 A1* | 12/2016 | Ljubuncic | G05D 1/0055 701/45 |
| 2017/0123423 A1* | 5/2017 | Sako | G05D 1/0088 |

* cited by examiner

Select your preference for this vehicle's ride:

comfort ⟵—○—⟶ sport

FIGURE 2A

Setting this preference will result in an additional 0.10 / mi cost. Confirm?

FIGURE 2B

How satisfied were you with the ride?

not at all ⟵—○—⟶ very

FIGURE 2C

We received your feedback. Sorry you didn't enjoy the ride, we promise the next one will be smoother!

FIGURE 2D

SYSTEM AND METHOD FOR AUTONOMOUS VEHICLE DRIVING BEHAVIOR MODIFICATION

CROSS-REFERENCE TO RELATED APPLICATIONS

This application claims the benefit of U.S. Provisional Application Ser. No. 62/308,719, filed on 15 Mar. 2016, which is incorporated in its entirety by this reference.

TECHNICAL FIELD

This invention relates generally to the vehicle automation field, and more specifically to new and useful systems and methods for autonomous vehicle driving behavior modification.

BACKGROUND

Vehicle automation has been suggested as a solution to this pressing issue almost as long as cars have been in existence—experiments on autonomy in cars have been conducted since at least the 1920s. Only recently, though, has computer technology advanced enough to make true vehicle automation possible.

Unfortunately, autonomous vehicles as implemented or designed today differ from their manually-operated counterparts in at least one significant manner: the ability to adjust driving style based on passenger preference. The ability to modify driving style according to passenger preference is especially important in autonomous vehicles because of the control disconnect between passengers and the autonomous vehicles—if passengers are not in control of the vehicle, they at least want it to behave in a predictable and confidence-inspiring manner. Further, different passengers may have drastically different desires or needs when it comes to how an autonomous vehicle drives. Thus, there is a need in the vehicle automation field to create methods for autonomous vehicle driving behavior modification. This invention provides such new and useful systems and methods.

BRIEF DESCRIPTION OF THE FIGURES

FIGS. 2A, 2B, 2C, and 2D are example view representations of a passenger interface of a system of a preferred embodiment.

DESCRIPTION OF THE PREFERRED EMBODIMENTS

Figure 1:
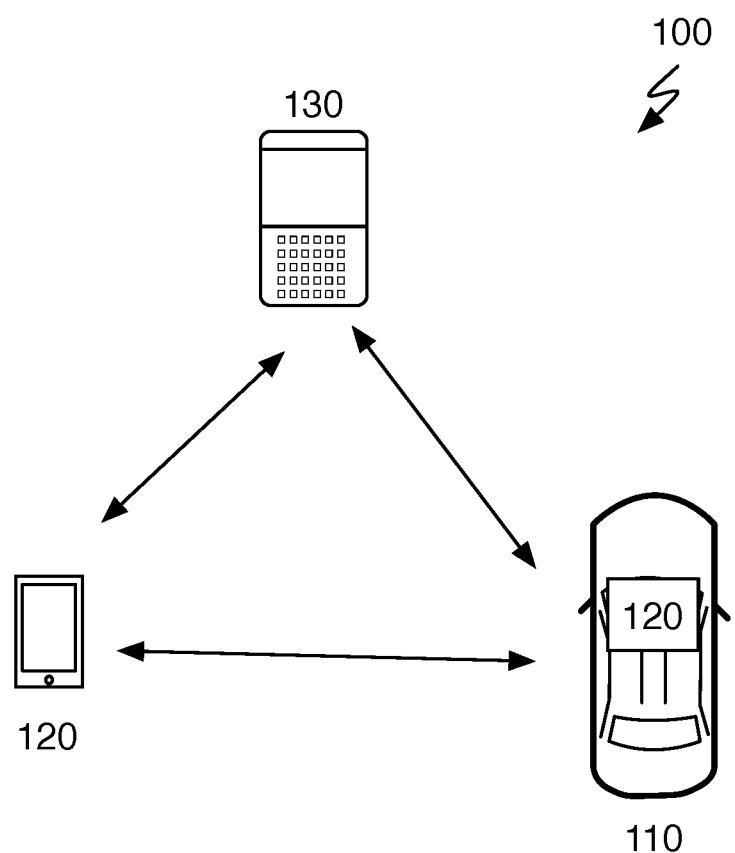
FIG. 1 is a diagram representation of a system of a preferred embodiment.

The following description of the preferred embodiments of the invention is not intended to limit the invention to these preferred embodiments, but rather to enable any person skilled in the art to make and use this invention.

Overview

The systems and methods of the present application function to enable an entity to tailor a driving behavior of an autonomous vehicle and in some instances, the driving behavior of an entire autonomous vehicle fleet. While the entity in many applications of the present application may be a passenger and/or a co-driver of an autonomous vehicle, the entity may be any person, device, organization or the like that has an interest in the riding experience or driving behavior of the autonomous vehicle.

Additionally, the systems and methods herein provide or allow one or more interfaces to interact with the autonomous vehicle in order to influence and/or modify the driving behavior of the autonomous vehicle. The interfaces for interacting with the autonomous vehicle can come in many forms and should not be limited to the ensuing examples or any other example interfaces mentioned herein. In the case of a passenger of the autonomous vehicle, the interface may be a mobile computing device (e.g., a mobile smart phone) that is able to wirelessly interface with the autonomous vehicle to provide driving behavior instructions. In the case of an administrator or manager of one or more autonomous vehicles, the interface may be a central computing device (e.g., a business PC or the like) that is operably in communication with the one or more autonomous vehicles.

It shall be noted that while some of the same interfaces and the like may be used to control routing, providing routing instructions, or may be used to generate route plans for an autonomous vehicle, a primary objective of several of the embodiments of the present application may be to augment the routing instructions for an autonomous vehicle with specific behavior attributes that an entity desires to control the operational behaviors of the autonomous vehicle while the autonomous vehicle is executing a route plan or routing instructions. Thus, in one or more of the embodiments of the present application, an autonomous vehicle may be provided with a route plan which includes routing instructions and separately, driving behavior instructions or preferences. The driving behavior preferences may be included with the route plan; however, it may not be necessary that an autonomous vehicle have or otherwise, be provided with driving behavior instructions in order to operate or otherwise, implement routing instructions.

It shall also be noted that while the driving behavior instructions may be different from or otherwise, a distinct set of instructions from routing instructions for an autonomous vehicle, driving behavior instructions may, in some embodiments, affect a route plan and corresponding routing instructions. For instance, if a driving behavior preferences of a passenger of an autonomous vehicle is that the autonomous vehicle not travel speed limits in excess of 35 mph, this may affect that one or more route segments in a route plan for the autonomous vehicle and consequently, affect the routing instructions provided to the autonomous vehicle. Accordingly, in some cases, the driving behavior preferences or instructions may be generated separately from the routing instructions but may nevertheless be used to modify or used, in addition to source and destination information, to generate a route plan and associated routing instructions.

1. System for Autonomous Vehicle Driving Behavior Modification

As shown in FIG. 1, a system 100 for autonomous vehicle driving behavior modification includes an autonomous vehicle 110, a passenger interface 120, and a vehicle coordinator 130. Although not shown, the system 100 may additionally or alternatively include a remote administrator interface that allows a non-passenger entity to set and/or modify the behavior settings of the autonomous vehicle 110. The non-passenger entity may be different from the vehicle coordinator 130, which may be a server.

The system 100 functions to enable an autonomous vehicle 110 to modify and/or set a driving behavior in response to parameters set by vehicle passengers (e.g., via the passenger interface 120) and/or other interested parties (e.g., via the vehicle coordinator 130 or remote administrator interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the autonomous vehicles no may be vehicles that switch between a semi-autonomous state and a fully autonomous state and thus, some autonomous vehicles may have attributes of both a semi-autonomous vehicle and a fully autonomous vehicle depending on the state of the vehicle.

The autonomous vehicle 110 preferably includes a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 110 may additionally or alternatively include interfaces for control of any other vehicle functions; e.g., windshield wipers, headlights, turn indicators, air conditioning, etc.

In addition, the autonomous vehicle 110 preferably includes an onboard computer and a sensor suite (e.g., computer vision system, LIDAR, RADAR, wheel speed sensors, GPS, cameras, etc.). The onboard computer functions to control the autonomous vehicle 110 and processes sensed data from the sensor suite and/or other sensors in order to determine the state of the autonomous vehicle 110. Based upon the vehicle state and programmed instructions, the onboard computer preferably modifies or controls driving behavior of the autonomous vehicle 110.

Driving behavior may include any information relating to how an autonomous vehicle drives (e.g., actuates brakes, accelerator, steering) given a set of instructions (e.g., a route). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes).

The communication interface of each autonomous vehicles functions to allow Internet and inter-vehicle communications. For example, in many autonomous vehicles a load balancing router may form part of the communication interface. The load balancing router may be a highly reliable Wi-Fi router. The load balancing router may be modified to include four cellular connection/communication chips for enabling highly reliable wireless communications (e.g., Internet communications, inter-vehicle communications, etc.) between each of the autonomous vehicles and between an autonomous vehicle and one or more servers used in system 100. In this way, a muxer is formed between the four chips such that signals from the four cellular chips may be combined into one signal over one or more shared mediums. This allows for the distribution of work between these four cellular chips to allow for the highly reliable connection.

The onboard computer functions to control the operations and functionality of the autonomous vehicles 110 and processes sensed data from the sensor suite and/or other sensors in order to determine states of the autonomous vehicles no. Based upon the vehicle state and programmed instructions, the onboard computer preferably modifies or controls behavior of autonomous vehicles 110.

The onboard computer is preferably a general-purpose computer adapted for I/O communication with vehicle control systems and sensor systems, but may additionally or alternatively be any suitable computing device.

The onboard computer is preferably connected to the Internet via a wireless connection (e.g., via a cellular data connection). Additionally or alternatively, the onboard computer may be coupled to any number of wireless or wired communication systems.

The sensor suite preferably includes localization and driving sensors; e.g., photodetectors, cameras, RADAR, SONAR, LIDAR, GPS, inertial measurement units (IMUs), accelerometers, microphones, strain gauges, pressure monitors, barometers, thermometers, altimeters, etc. In addition to localization and driving sensors, the autonomous vehicle 110 may also include sensors for detecting passenger feedback (e.g., cameras, heart rate monitors, microphones, galvanic skin response sensors, etc.) as described in the section on the method 200.

The passenger interface 120 enables an autonomous vehicle passenger to interact with and provide information to an autonomous vehicle. The passenger interface 120 is preferably a web interface or a native application interface accessible through a mobile electronic device (e.g., a smartphone, a laptop computer, etc.) but may additionally or alternatively be any interface through which a user may communicate with an autonomous vehicle 110 or a system that affects control of an autonomous vehicle 110 (e.g., the vehicle coordinator 130). For example, a passenger interface 120 may be a touchscreen in an autonomous vehicle 110. The passenger interface 120 is preferably any interface capable of receiving user input as described in the section on the method 200. Additionally or alternatively, the passenger interface 120 may be any interface capable of influencing autonomous vehicle driving behavior; for instance, the passenger interface 120 may be the user interface of a ridesharing platform that controls vehicle behavior via the vehicle coordinator 130.

Examples of the passenger interface 120 are as shown in FIGS. 2A-2D.

The vehicle coordinator 130 functions to monitor and/or control autonomous vehicles no (e.g., by setting rules that the autonomous vehicle 110 follows). The vehicle coordinator 130 preferably provides the interface between the autonomous vehicle 110 and any influencers of driving behavior other than passengers communicating directly with the autonomous vehicle 110 (e.g., a remote expert, a passenger or ridesharing user via an application, a central computer of an autonomous vehicle platform).

The vehicle coordinator 130 preferably aggregates passenger feedback (and/or other feedback) and utilizes this to modify driving behavior (as described in the section on the method 200), but this task may additionally or alternatively be performed by the autonomous vehicle 110 or any other suitable computationally-enabled device.

Note that the vehicle coordinator 130 may use passenger feedback to modify driving behavior for any vehicle for which said modification is available; e.g., vehicle feedback from passengers may be used to modify driving behavior across an entire vehicle fleet.

The vehicle coordinator 130 is preferably a remote server (or distributed computing system) connected to the autonomous vehicle 110 via an internet connection, but may additionally or alternatively be any suitable computing system (e.g., a collection of autonomous vehicle computers working as a distributed computing system).

The vehicle coordinator 130 preferably may take input from autonomous vehicles no, passenger interfaces 120, and/or any other source relevant to autonomous vehicle driving behavior. For example, the vehicle coordinator 130 may take remote expert input from a remote expert as described in U.S. Provisional Patent Application No. 62/274,577, filed on 4 Jan. 2016, the entirety of which is incorporated by this reference.

Data received by the vehicle coordinator 130 may potentially traverse multiple network hops before being received; e.g., autonomous vehicle sensor data may be sent from a first vehicle to a second vehicle, from the second vehicle to a third vehicle, and from a third vehicle to an internet-enabled base station, before finally being communicated to the vehicle coordinator 130 via the internet or any other suitable means.

2. Method for Autonomous Vehicle Driving Behavior Modification

Figure 3:
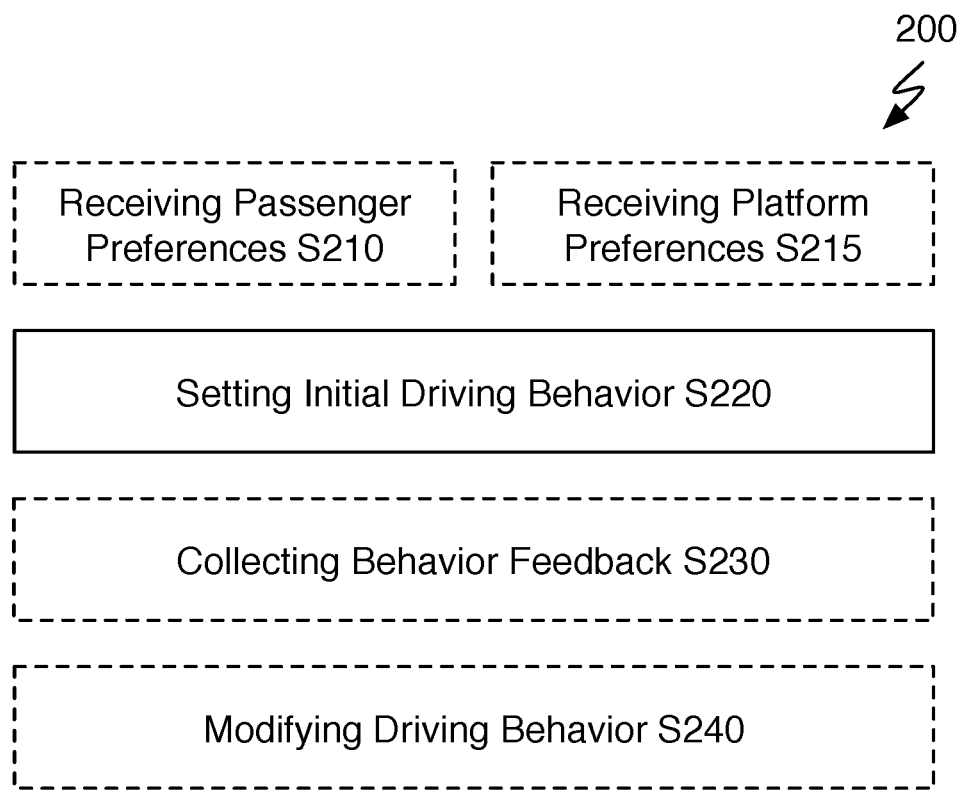
FIG. 3 is a chart representation of a method of a preferred embodiment.

As shown in FIG. 3, a method 200 for autonomous vehicle driving behavior modification preferably includes receiving passenger driving behavior preferences S210, receiving platform driving behavior preferences S215, setting initial driving behavior S220, collecting behavior feedback S230, and modifying driving behavior S240. The method 200 may additionally or alternatively include any subset of the preceding steps including a subset step S225 for generating behavior control instructions, another subset step S228 for modifying routing instructions with the generated behavior control instructions, and a further subset step S245 for reverting the driving behavior of the autonomous vehicle from a set driving behavior based on passenger preferences to a base or standard driving behavior for the autonomous vehicle.

The method 200 functions to enable setting driving behavior of an autonomous vehicle to suit driving behavior preferences of vehicle passengers and/or of autonomous vehicle platforms (or vehicle owners, etc.). The method 200 may additionally or alternatively include collecting behavior feedback, which can be used to further modify driving behavior from initial settings.

Generally, a driving behavior of an autonomous vehicle may be set at an initialization of the autonomous vehicle or periodically adjusted or reset by a central governing authority, such as a remote and central vehicle coordinator. The driving behavior parameters or controls that are set for an autonomous vehicle at initialization or otherwise, before a passenger interacts with the autonomous vehicle, may be fleet-wide settings that are common to all autonomous vehicles considered to be in a fleet. However, as an autonomous vehicle that has been centrally initialized with driving behavior settings operates to interact with passengers, such as in a ridesharing setting, the driving behavior set for the autonomous at initialization and/or that is common to all autonomous vehicles in a fleet may be adjusted by passengers and the like to accommodate the specific preferences of the passenger, owner of the vehicle, and the like. Accordingly, the passenger preferences for driving behavior may act to modify any initialized driving behavior set by a central governing authority or the like (including driving behaviors set by other or previous passengers of the autonomous vehicle). Based on operations of each of a plurality of autonomous vehicles in a fleet, it is possible that each of the plurality of autonomous vehicles in the fleet may have set different driving behaviors based on interactions with passengers throughout one or more periods of driving operation (e.g., throughout one or more periods of operating under a ridesharing platform). Of course, once the one or more periods of driving operation for the fleet may be completed, a central governing authority or the like may re-initialize each autonomous vehicle in the fleet to have a common or base driving behavior settings.

Driving behavior may include any information relating to how an autonomous vehicle drives (e.g., actuates brakes, accelerator, steering, other controls) given a set of instructions (e.g., a route). The information relating to the driving behavior of an autonomous vehicle, in some embodiments, produces information that is observable by a passenger of the autonomous vehicle or an external entity. Thus, the driving behavior in such embodiments may include actions or operations performed by an autonomous vehicle while performing a route that is readily observable by an entity. The actions or operations performed by the autonomous vehicle may be observed by one or more of a human passenger's five senses and/or otherwise, observed by one or more sensors (e.g., camera, gyrometer, accelerometer, etc.) associated with an entity.

Driving behavior may additionally or alternatively include any information about how an autonomous vehicle calculates routes (e.g., prioritizing fastest time vs. shortest distance), and/or how an autonomous vehicle responds to environmental stimulus (e.g., how an autonomous vehicle behaves if it is raining, or if an animal jumps in front of the vehicle). Driving behavior may additionally or alternatively include information relating to manners in which an autonomous vehicle operates during driving and non-driving functions (e.g., parked or similar non-moving states). Some examples of elements that may contribute to driving behavior include acceleration constraints, deceleration constraints, speed constraints, steering constraints, suspension settings, routing preferences (e.g., scenic routes, faster routes, no highways), lighting preferences, sound preferences (e.g., music or other audio projected by the AV), "legal ambiguity" conduct (e.g., in a solid-green left turn situation, whether a vehicle pulls out into the intersection or waits at the intersection line), action profiles (e.g., how a vehicle turns, maneuvers, or changes lanes), and action frequency constraints (e.g., how often a vehicle changes lanes or performs driving maneuvers).

The method 200 may satisfy a number of goals for different parties; for example, an individual passenger may benefit from a customized driving behavior of the autonomous vehicle that suits his or her needs (even if said needs change day by day). As another example, an autonomous vehicle fleet owner may benefit from driving behavior that results in efficient and cost effective use of the fleet. For instance, an autonomous fleet owner may provide, as driving behavior preferences, one or more autonomous vehicle operating parameters that modifies a manner in which the autonomous vehicle performs acceleration, braking operations, and the like to preserve fuel or battery power and to reduce wear and tear on the breaking system of an autonomous vehicle. In this way, the cost of fueling the autonomous vehicle and maintenance of the autonomous vehicle is reduced thereby rendering a cost effective operation of the autonomous vehicle based on the fleet owner's driving preferences.

The method 200 is preferably implemented by the system 100, but may additionally or alternatively be implemented natively by an autonomous vehicle and/or by any system capable of interfacing with an autonomous vehicle.

S210 includes receiving passenger driving behavior preferences. S210 functions to receive information from a passenger that describes how the passenger would prefer and/or desire the autonomous vehicle to drive or operate. Additionally, or alternatively, S210 may include receiving driving behavior preferences from any entity other than a passenger having an interest in controlling a driving behavior of an autonomous vehicle.

Driving behavior preferences generally enable to define a modus operandi (e.g., mode of operation) of an autonomous vehicle or otherwise, redefine a base or standard mode of operation of an autonomous vehicle. The base or standard mode of operation may include driving behavior preferences set at initialization, re-initialization, or other autonomous programming performed a governing authority (e.g., vehicle coordinator) of a fleet of autonomous vehicles. Setting of the base or standard mode of operation of the autonomous vehicle during initialization is preferably performed at a time at which the autonomous vehicle is not operable (e.g., offline) to performing passenger or entity pickup operations. For instance, while an autonomous vehicle is offline system updates and relating software updating to the autonomous vehicle may be performed. During an offline state, an autonomous vehicle is preferably not available or otherwise, accessible by a passenger to performing ridesharing or passenger delivery operations. However, once the autonomous vehicle comes back online (e.g., normal operating state), the autonomous vehicle should preferably be operating under a base or standard mode of operation that has not yet been modified by passenger preferences or the like. It shall be noted that while the autonomous vehicle is in an offline state, it may be possible to program or update the autonomous vehicle with passenger or owner preferences, especially in the instances in which the passenger or owner is responsible for general system updates or providing initialization settings (e.g., passenger purchases new autonomous vehicle or the like).

Passenger driving behavior preferences (hereafter referred to as passenger preferences) may include any information that relates to a preferred set of driving behavior characteristics for a passenger. The relationship between passenger preferences and driving behavior may be explicit or implicit; in an explicit relationship, passenger preferences are directly related to driving behavior (e.g., a passenger preference may include limiting maximum forward acceleration to 0.4 g), while in an implicit relationship, passenger preferences are related to driving behavior through an intermediary preference interpretation (e.g., a passenger preference may include a selection of '5' on a 0-10 'comfort to sporty' driving behavior spectrum; the autonomous vehicle must interpret this selection to apply it to driving behavior, as shown in FIG. 2A).

FIG. 2A generally illustrates an example user interface for selecting by a passenger or the like a mode of operation of an autonomous vehicle that ranges from comfort to sporty. The example user interface allows the passenger to select or slide a selectable input feature to a passenger-determined position along the comfort to sporty scale that best matches the passenger's driving behavior preferences for the autonomous vehicle. Upon positioning the selectable input button along the scale at a desired location, the passenger may confirm his or her selection by further selecting a confirmation button (e.g., the check box). The autonomous vehicle would then be tasked with converting or interpreting the scaled passenger preference input to a control value (e.g., velocity set: 47.5 mph for velocity sport mode) or a control value range (e.g., velocity set: 45 mph to 50 mph for moderate sport mode) that can be used to generate driving behavior controls or instructions that the autonomous vehicle can implement or execute.

Some example classes of passenger preferences include ride preferences, route preferences, and disruption preferences.

Ride preferences preferably include any preferences related to how the autonomous vehicle travels along a route independent of the route selection or determination process for the autonomous vehicle; for example, acceleration preferences (e.g., max forward acceleration, max lateral acceleration, preferred acceleration profile), deceleration preferences (e.g., max braking, preferred braking profile), speed preferences (e.g., max speed, preferred average speed), steering preferences (e.g., turn radius, steering rotation speed), suspension preferences (e.g., preload, rebound, damping), environmental reaction preferences, (e.g., speed shaved in response to detection of a puddle), efficiency preferences (e.g., minimum miles per kWh), action profile preferences (e.g., minimum time to lane change, following distance), lighting preferences (e.g., "always drive with lights on"); legal ambiguity preferences (e.g., not changing lanes in an intersection even in jurisdictions where doing so is not illegal but often ticketed), and action frequency constraints (e.g., max number of lane changes per minute). While the preceding examples are explicitly related to driving behavior, ride preferences may additionally or alternatively include any subject measurement of ride preference. For example, passengers may be asked to select (e.g., on a sliding scale) a point on a speed/comfort scale. Other potential scales might include 'driving sportiness', 'driving safety', 'driving speed' (e.g., slow/fast). Passengers may additionally or alternatively be asked to prioritize preferences; e.g., "Please rank from top to bottom the following: 'I would like to arrive on time', 'I would like to minimize the duration of the ride', 'I would like to be comfortable on my ride'".

Route preferences preferably include any preferences related to how the autonomous vehicle determines a route between two or more points (e.g., source and destination). Some examples of route preferences may include trip duration preferences, (either per trip, or average trip duration across some set of vehicles and/or times), arrival time preferences (e.g., percentage of time vehicle is on time or early), cost (e.g., of ridesharing vehicles, energy cost, maintenance cost), sights (e.g., going past notable landmarks within a certain distance of a standard route), business driveby (e.g., passing certain businesses or advertisements). Route preferences may additionally or alternatively include preferences for routing area (e.g., avoid a particular area) or street type (e.g., avoid highways). Similar to ride preferences, route preferences may also be set using subjective metrics: e.g., "Do you prefer a more scenic route or a faster arrival time?"

Disruption preferences preferably include preferences that describe passenger tolerance to disruption (e.g., stops to charge a vehicle, deliver a package, pick up other passengers). Disruption preferences may be measured in multiple ways; for example, passengers may be asked how much they dislike various types or durations of disruption. As another example, passengers may be asked how much they would pay to avoid various types/durations of disruption (or what cost they would ask to submit to disruption). Similar to ride and route preferences, disruption preferences may be set using subjective metrics.

Passenger preferences may additionally or alternatively include any preferences related to driving behavior. Some passenger preferences may overlap classes; for example, a passenger preference for a smoother ride may cause a vehicle to both alter suspension settings (ride preference) and route away from bumpy roads (route preference).

Passenger preferences may be set in any manner. For example, passenger preferences may be set by passengers using a user interface of a native application on a smartphone, as shown in FIG. 2A. As another example, passenger preferences may be set by passengers using a user interface of a touchscreen of an autonomous vehicle. As a third example, passenger preferences may be set by passengers issuing voice commands to a receiver inside an autonomous vehicle.

Passenger preferences may also be set based on default values (e.g., values specified by an autonomous vehicle manufacturer without passenger input). Default preferences may be general (e.g., all vehicles of the same type have the same default passenger preferences), but may additionally or alternatively be specifically determined based on information known about the passenger (e.g., weight, height, age, gender, nationality) and/or information inferred about the passenger (e.g., if the vehicle is picking up someone from a hospital, it may be inferred that the passenger may prefer a more delicate ride; if the passenger indicates she is riding with multiple people, it may be inferred that the suspension should be stiffer). Thus, based on one or more data points about the passenger(s) and/or data points about the circumstances of the passenger, the autonomous vehicle may be able to infer one or more potential passenger preferences and set on its own driving behavior preferences that may be suitable to the passenger(s).

Passenger preferences are preferably stored in a profile linked to a particular passenger so that any vehicle a passenger rides in may benefit or utilize that passenger's preferences automatically (without the passenger necessarily having to re-specify them). For instance, a passenger's profile may be linked to passenger preference dataset that is further linked or associated with a ridesharing application that is accessible to the user. In such instance, when the passenger makes a pickup request for an autonomous vehicle, the pickup request may automatically trigger a search for a passenger profile and the passenger preferences linked therewith. In this way, the autonomous vehicle may automatically obtain the passenger's driving behavior preferences and the like contemporaneous with performing the pickup request. Each profile linked to a particular passenger may be stored in an anonymous manner so that personally identifying information about the particular passenger is not revealed to a subsequent passenger who chooses to utilize a pre-existing profile of the particular passenger for setting autonomous vehicle driving behavior and/or routing preferences. Additionally or alternatively, passenger preferences may be stored or set in any manner.

Passenger preferences may be translated for differing vehicles: for example, a passenger suspension preference may be modified depending on the vehicle the passenger rides in (ideally to result in a similar perceived ride). In such embodiments, the passenger may set passenger preferences for a first type of vehicle (e.g., a sedan or the like) at a first period of time. When the passenger seeks to obtain a ride at a second period of time from a second type of vehicle (e.g., an SUV) that is different from the first type of vehicle, a system associated with the autonomous vehicle may obtain the specifications of the first type of vehicle and specifications of the second type of vehicle, compare the specifications of the first and second type of vehicles to determine differences between them. Based on the identified differences, the system of the autonomous vehicle may adjust to increase or decrease one or more of the parameters of the passenger preferences to take into account the differences between the first and second type of vehicle. Effectively, the system associated with the autonomous vehicle is able to convert or translate passenger preferences associated with a first type of vehicle to passenger preferences for a second type of vehicle without any additional passenger input.

Passenger preferences may be either static (i.e., they always apply) or conditional. For example, a passenger may prefer, the vehicle may infer a preference, or the vehicle coordinator may create a preference for, a certain behavior when the passenger is riding in sunny weather and another behavior when the passenger is riding in heavy rain. Examples of conditions that may affect passenger preference include weather, passenger emotion, time of day, date, vehicle type, route, source, destination, road quality, traffic, road type (e.g., highway, surface road), number of other passengers, identity of other passengers, and cargo carried by the vehicle. Emotion of the passenger may be inferred in various manners including using the one or more sensors of the autonomous vehicle and/or from data obtained from one or more wearable electronic devices associated with the passenger. Passenger emotion information may be obtained in any suitable manner.

If multiple passengers are present in a vehicle, passenger preferences may be determined in any manner. For example, the more conservative of two passengers' preferences may be applied (e.g., slower speed/acceleration). As another example, one passenger may have preference seniority/authority (resulting in that passenger's preferences being applied to the exclusion of the other's) based on being the payer for the ride or owner of the vehicle, or any other weighting system. As a third example, urgency or extremity of passenger preferences may be used to determine which are applied (e.g., a passenger who really hates going fast may have their preferences applied to the detriment of a passenger who prefers going fast, but doesn't care much about it).

S215 includes receiving platform driving behavior preferences. S215 functions to receive information from an autonomous vehicle platform (or from another entity with control over the autonomous vehicle) that describes how the platform would prefer the autonomous vehicle drive.

While the following paragraphs will refer to the autonomous vehicle platform as a source of driving behavior preferences, it shall be understood that the source of driving behavior preferences in S215 may be any non-passenger entity with control or interest in an autonomous vehicle. For example, the source of driving behavior preferences in S215 may be an owner of an individual autonomous vehicle, or a corporate administrator that manages a ridesharing account for a company (in the latter case, setting company-wide driving profiles may be helpful for insurance purposes).

Platform driving behavior preferences (hereafter referred to as platform preferences) may include any information that relates to a preferred set of driving behavior characteristics for an autonomous vehicle platform or other entity. Platform preferences are preferably explicitly related to driving behavior, but may additionally or alternatively be implicitly linked, similar to passenger preferences.

Similar to passenger preferences, platform preferences may include ride preferences, route preferences, and disruption preferences. In general, platform ride and route preferences are preferably similar to passenger ride and route preferences (e.g., either or both of a passenger and platform may have preferences for maximum acceleration). In contrast, platform disruption preferences are generally (though not necessarily) complementary to passenger disruption preferences (e.g., minimum payment to submit to disruption for a passenger vs. maximum amount the platform is willing to pay for disruption). Platform preferences may additionally or alternatively include any preferences related to driving behavior. For example, platform preferences may include preferences related to source or destination applied across a corporate ridesharing account.

Platform preferences are preferably set by a platform administrator, but may additionally or alternatively be set in any manner. Similar to passenger preferences, platform preferences may be static or conditional. For example, platform preferences may include preferences related to acceleration constraints conditional on passenger demographic data (e.g., not accelerating quickly when elderly people are in the vehicle). As another example, platform preferences may include preferences related to acceleration constraints conditional on cargo or other items being carried in an autonomous vehicle (e.g., acceleration constraints may be lower if the vehicle is carrying a fragile shipment).

S220 includes setting initial driving behavior. S220 functions to set an initial driving behavior of the autonomous vehicle based on at least one of received passenger preferences (note that these may be default passenger preferences) and received platform preferences.

S220 preferably includes setting initial driving behavior by applying preferences with an explicit relationship to driving behavior of the autonomous vehicle (e.g., a preference for maximum acceleration limits the vehicle's maximum acceleration). S220 may additionally or alternatively include applying preferences with an implicit relationship to driving behavior based on a preference interpretation.

Preference interpretations are preferably algorithms or other transformations that describe the relationship between a preference and driving behavior parameters (if such a relationship is not straightforward). For example, a '5' on a 0-10 speed/comfort scale is processed by a preference interpretation for that preference to generate driving behavior parameters (e.g., max acceleration, max speed, suspension settings). Accordingly, in some embodiments, a reference database may be made available to the autonomous vehicle for facilitating the preference interpretations. Specifically, the reference database may link or store in association allowable passenger preference values and a corresponding driving parameter that the autonomous vehicle can comprehend and apply to its driving behavior. Thus, an example algorithm may include receiving a passenger scaled value (e.g., '5'); referencing the scaled value to the reference database; identifying a corresponding driving parameter to the passenger input preference; determining one or more autonomous vehicle controls for implementing the driving parameter; and implementing the autonomous vehicle controls for controlling the driving behavior of the autonomous vehicle during a route involving the passenger. It shall be noted that this is merely an example and any suitable algorithm or passenger driving behavior preference transformation may be used.

Preference interpretations are preferably general; that is, the interpretation for a given passenger preference is the same across all passengers. Additionally or alternatively, preference interpretations may be customized for individual passengers. This may be useful to allow passengers to accurately reflect their preferences without overwhelming them with choice. For example, a passenger's speed/comfort scale interpretation may be re-centered at driving parameters corresponding to a lower value if that passenger consistently chooses values at the lower end of the scale; e.g., initially, 0 corresponds to a max acceleration of 0.1 g, 1 corresponds to 0.2 g, 2 corresponds to 0.3 g, and so on, but after re-centering, 0 corresponds to a max acceleration of 0.05 g, 1 corresponds to 0.1 g, 2 corresponds to 0.15 g, and so on.

Preference interpretations may be altered in any manner and for any reason. For example, preference interpretations for complex preferences (i.e., preferences that affect multiple driving parameters) may be modified to change the effect the preference has on a subset of driving parameters it affects. As a more specific example, from feedback the method 200 may identify that a passenger really values getting to a location quickly (and thus values speed), but is very sensitive to lateral acceleration. In response, the preference interpretation may be modified to increase maximum forward acceleration constraints while reducing maximum lateral acceleration constraints (enabling a reduction of lateral acceleration without an increase in time) for a given preference setting.

If S220 includes setting initial driving behavior based on both platform preferences and passenger preferences, S220 may determine which preferences are applied in any manner. For example, if two settings conflict, the more conservative of the two settings may be applied. As another example, platform preferences may be preferred for any conflicting preferences (or conflicting driving behavior settings resulting from application of those preferences). As a third example, platform preferences may include metadata specifying whether they should override conflicting passenger preferences or not. As a fourth example, platform preferences related to certain vehicle behaviors (e.g., following the law) may take priority over all other preferences.

S220 may additionally or alternatively include asking a human for approval in situations where platform and passenger preferences conflict. For example, if a passenger attempts to set a higher maximum acceleration than is specified by platform constraints, a platform administrator may be notified and asked if he/she will allow the passenger to override the platform constraint. As another example, if a passenger attempts to set a high maximum speed, which conflicts with platform preferences relating to energy consumption, the passenger may be asked if he/she would like to apply the high speed preference, with a note that the passenger will pay more as a result of heightened energy consumption (and potentially an estimation or calculation of additional cost), as shown in FIG. 2B.

S225 includes generating driving behavior controls based on or using the passenger preferences. Accordingly, S225 functions to convert the passenger preferences into useable autonomous vehicle instructions and/or controls that may be implemented by the autonomous vehicle. For example, if the passenger provides a driving behavior preference of sporty, the autonomous vehicle or a system or associated therewith may convert the sporty passenger preference input to autonomous vehicle control parameters that causes the autonomous vehicle to accelerate at a high rate and also, maintain a relatively high velocity while the autonomous vehicle travels a route.

S228 functions to enable the modification of routing instructions based on the generated driving behavior instructions or controls for the autonomous vehicle. In some embodiments, the routing instructions are generated in advance of a time at which a passenger provides driving preferences. In other instances, when the passenger's driving preferences are predetermined or otherwise, stored in association with a profile or an account of the passenger, the routing instructions and driving behavior controls may be generated at a same time or contemporaneous (substantially the same time) with each other. In either case, the routing instruction are preferably generated independently of the driving behavior instructions based on the passenger-provided preferences. The routing instructions are preferably based on objective locations, such as a source location (e.g., a pickup location) and a destination location (e.g., drop off location) of the passenger. By comparison, the passenger preference input is based on subjective passenger desires.

S228 may modify predetermined routing instructions for an autonomous vehicle based on the generated driving behavior controls for the autonomous vehicle. Referring to the previous example in which the passenger prefers a sporty ride, these preferences of the user translates into driving controls that may cause the autonomous vehicle to accelerate at a high rate and also, maintain a high rate of velocity. In such instance, the driving behavior controls may modify the routing instructions to change the instructions to include one or more route segments in which the autonomous vehicle is legally capable of accelerating at a high rate and traveling at high rates of velocity.

Additionally, S228 may generate a cost estimate to implement the passenger preferences based on the changes to the driving behavior of the autonomous vehicle resulting from the passenger preference input. For instance, in some embodiments, implementing passenger preferences for a longer route with less action profiles (e.g., lane changes or maneuvers) may result in a longer route for the autonomous vehicle and thereby the consumption of more fuel. S228 may calculate a first cost estimate that illustrates the cost of the ride with the passenger preferences illustrated, a second cost estimate that illustrates the cost of the ride without the passenger preferences, and a difference value between the first and second cost estimate. The cost estimates may be presented via a user interface or the like and may also include an explanation or rationale (e.g., passenger-preference route consumes additional fuel to maintain high rates of velocity) for a difference in the cost estimate values.

S230 includes collecting behavior feedback. S230 functions to collect feedback on driving behavior from passengers and/or other sources (e.g., platform administrators, pedestrians, remote experts). Behavior feedback preferably includes any information generated or submitted in response to driving behavior.

S230 may include collecting behavior feedback from passengers in any manner. For example, passengers may provide explicit feedback using an interface (e.g., touchscreen interface of an autonomous vehicle, the passenger's phone, audio triggers and commands) rating their satisfaction and/or identifying complaints with vehicle driving behavior, as shown in FIG. 2C. Likewise, an autonomous vehicle platform may provide explicit feedback (potentially automatically generated) on energy consumption to aid the autonomous vehicle in better matching energy consumption platform preferences.

S230 may additionally or alternatively include gathering implicit feedback. For example, S230 may include capturing video data of a passenger's face and/or body and using gesture detection or expression detection to determine the emotional state of the passenger. This state may be interpreted as feedback (e.g., if the passenger looks scared, the vehicle may be accelerating too quickly). As another example, S230 may include measuring passenger heart rate (e.g., optically) and/or passenger eye movement rate via image data. As a third example, S230 may include taking audio data of the passenger; audio data may be interpreted in a number of ways including speech feature detection (e.g., identifying gasps), emotion detection (e.g., using MFCC coefficients), volume/pitch detection, and/or speech content detection (e.g., figuring out what a passenger is saying and interpreting that; "Oh God! Too Fast!"). As a fourth example, S230 may include measuring passenger grip or touch on certain areas of the autonomous vehicle. In many situations, scared passengers may grab door handles; the method 200 may include receiving data from sensors embedded in said door handles (or another part of the autonomous vehicle) to interpret whether a user is gripping the handle (and potentially to what extent). S230 may additionally or alternatively include collecting any data from passengers that may be useful in interpreting a passenger's reaction or response to the autonomous vehicle's driving behavior.

S240 includes modifying driving behavior. S240 functions to modify driving behavior based on behavior feedback collected in S230.

S240 may include modifying driving behavior in any manner. For example, S240 may include updating passenger and/or platform preferences based on feedback received in S230 (which in turn modifies driving behavior). Note that driving behavior may be modified by changing passenger preferences linked to an account between vehicle rides (therefore, driving behavior may be modified at a time when a vehicle is not necessarily driving). Driving behavior may additionally or alternatively be modified in real-time.

Alternatively, S240 may include modifying driving behavior without necessarily modifying preferences. This may occur for several reasons; for example, S240 may include modifying the interpretation of implicitly related preferences without modifying the preferences themselves. As another example, S240 may include modifying driving behavior based on condition changes (e.g., as specified by passenger and/or platform preferences).

In a first condition change example, the autonomous vehicle may detect that a passenger is sick and/or sleeping and modify driving behavior in response to this detection (e.g., driving more slowly). In a second condition change example, the autonomous vehicle may detect that all passengers have exited the vehicle, resulting in removal of passenger preferences and a conditional change in platform preferences (e.g., the maximum lateral acceleration of an autonomous vehicle not carrying passengers may potentially be much higher than when carrying passengers).

S240 may additionally or alternatively include notifying one or more entities (e.g., passenger, autonomous vehicle platform, remote expert) of modified driving behavior, as shown in FIG. 2D. For example, S240 may include notifying a passenger "Hey, we noticed you were reading a book, so we slowed down!" or "We received your feedback and have altered the suspension to give you a smoother ride!"

Likewise, S240 may include confirming behavior changes (either before or after application) with one or more entities (e.g., passenger, platform, remote expert).

S245 functions to revert the driving behavior of the autonomous vehicle from a set driving behavior based on passenger preferences to a base or standard (e.g., first driving behavior) for the autonomous vehicle. The base or standard driving behavior for the autonomous vehicle is preferably set at a time prior to the passenger's interaction with the autonomous vehicle. Thus, in some embodiments, the passenger's preferences functions to modify the base or standard driving behavior of the autonomous vehicle.

Once the autonomous vehicle completes one or more routes involving the passenger and/or drops off the passenger at his or her destination, this event may trigger the autonomous vehicle or a system associated therewith to revert the driving behavior of the autonomous vehicle back to a base, standard, or normal state.

In some embodiments, a passenger's preferences may be maintained by the autonomous vehicle even after the passenger has been delivered or dropped off at a destination if it is determined that the passenger preferences enhance the driving behavior of the autonomous vehicle and/or improves the cost and/or efficiency of operating the autonomous vehicle.

The method of the preferred embodiment and variations thereof can be embodied and/or implemented at least in part as a machine configured to receive a computer-readable medium storing computer-readable instructions. The instructions are preferably executed by computer-executable components preferably integrated with an autonomous vehicle. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for setting behavior of an autonomous vehicle, the system comprising:
   a non-transitory computer readable medium comprising a passenger interface that is configured to, by a processor, receive one or more behavior parameters from a passenger, wherein the one or more behavior parameters relate to expected behavior of the autonomous vehicle during one or more routes of the autonomous vehicle, wherein the behavior parameters include parameters indicating how to respond to environmental stimulus during the one or more routes of the autonomous vehicle;
   a non-transitory computer readable medium comprising a vehicle coordinator configured to, by a processor,
      generate behavior controls executable by the autonomous vehicle based on the one or more behavior parameters from the passenger; and
      implement the behavior controls by the autonomous vehicle while travelling along the one or more routes of the autonomous vehicle.

2. The system of claim 1, wherein the vehicle coordinator is further configured to:
   collect explicit vehicle behavior feedback, during and/or after the one or more routes of the autonomous vehicle, from the passenger of the autonomous vehicle; and
   modify the driving behavior of the autonomous vehicle based on the vehicle behavior feedback.

3. The system of claim 1, further comprising an electronic device of the passenger having a native application stored within a non-transitory computer-readable medium wherein, when the native application is executed, the electronic device is configured to generate the passenger interface for receiving the one or more behavior parameters.

4. A method for controlling a behavior of an autonomous vehicle, the method comprising:
   generating routing instructions for one or more routes of an autonomous vehicle based on a source and a destination of a passenger;
   receiving behavior parameters from the passenger for setting a behavior of the autonomous vehicle, wherein the behavior parameters relate to expected behavior of the autonomous vehicle during the one or more routes, wherein the behavior parameters include parameters indicating how to respond to environmental stimulus during the one or more routes of the autonomous vehicle;
   generating behaviors controls based on the behavior parameters; and
   implementing the behavior controls by the autonomous vehicle while travelling along the one or more routes.

5. The system of claim 1, wherein the vehicle coordinator is further configured to, by the processor, collect, via one or more sensors, implicit passenger feedback based on measuring one or more reactions and biometric responses of the passenger during the one or more routes of the autonomous vehicle; and update the behavior parameters based on the implicit passenger feedback.

6. The system of claim 1,
   wherein the vehicle coordinator is further configured to, by the processor, update passenger driving behavior preferences associated with an account linked to the passenger.

7. The method of claim 4, further comprising:
   identifying first behavior parameters for a first type of autonomous vehicle, wherein the behavior parameters stored in association with or linked to the first type of autonomous vehicle;
   selecting the behavior parameters for a second type of autonomous vehicle, wherein the first type of autonomous vehicle and the second type of autonomous vehicle are different from each other;
   identifying one or more vehicle differences between the first and the second type of autonomous vehicles;
   translating the behavior parameters to second behavior parameters for the second type of autonomous vehicle by modifying the first behavior parameters based on the identified one or more vehicle differences;
   setting the second behavior parameters for the second type of autonomous vehicle, wherein the second type of autonomous vehicle comprises the autonomous vehicle.

8. The system of claim 1, wherein the behavior controls are associated with at least one of windshield wipers, headlights, turn indicators, and air conditioning of the autonomous vehicle.

9. The system of claim 1, wherein the behavior parameters further include parameters indicating how to respond to apply traffic rules during the one or more routes of the autonomous vehicle.

10. The system of claim 1, wherein the behavior parameters further include parameters indicating passenger tolerance to disruptions during the one or more routes of the autonomous vehicle.

11. The system of claim 1, wherein the vehicle coordinator is further configured to generate a cost estimate based on the behavior controls of the autonomous vehicle.

* * * * *